(12) United States Patent
Cruson (10) Patent No.: US 8,757,074 B2
(45) Date of Patent: Jun. 24, 2014

(54) DECELERATING DEVICE FOR AIR CONVEYED MATERIAL

(75) Inventor: Brian Cruson, Rosedale (CA)

(73) Assignee: Tread Enterprises, Ltd., Rosedale, British Columbia (CA)

( * ) Notice: Subject to any disclaimer, the term of this patent is extended or adjusted under 35 U.S.C. 154(b) by 242 days.

(21) Appl. No.: 13/371,624

(22) Filed: Feb. 13, 2012

(65) Prior Publication Data

US 2012/0312212 A1    Dec. 13, 2012

Related U.S. Application Data

(60) Provisional application No. 61/548,244, filed on Oct. 18, 2011, provisional application No. 61/494,964, filed on Jun. 9, 2011.

(51) Int. Cl.
*A01C 7/04* (2006.01)
*A01C 7/20* (2006.01)
*A01C 7/16* (2006.01)
*A01C 7/08* (2006.01)

(52) U.S. Cl.
CPC .................. *A01C 7/042* (2013.01); *A01C 7/206* (2013.01); *A01C 7/20* (2013.01); *A01C 7/16* (2013.01); *A01C 7/084* (2013.01); *A01C 7/082* (2013.01)
USPC ......................................................... 111/176

(58) Field of Classification Search
CPC ............ A01C 7/042; A01C 7/04; A01C 7/00; A01C 7/206; A01C 7/20; A01C 7/16; A01C 7/125; A01C 7/124; A01C 7/123; A01C 7/107; A01C 7/102; A01C 7/10; A01C 7/085; A01C 7/084; A01C 7/082; A01C 7/081; A01C 7/08; A01C 15/04
See application file for complete search history.

(56) References Cited

U.S. PATENT DOCUMENTS

| | | | |
|---|---|---|---|
| 4,493,273 A | 1/1985 | Gauchet et al. | |
| 6,505,569 B1 | 1/2003 | Richard | |
| 7,509,915 B2 | 3/2009 | Memory | |
| 2002/0144637 A1 | 10/2002 | Wendling et al. | |

*Primary Examiner* — Christopher J Novosad
(74) *Attorney, Agent, or Firm* — Ryan W Dupuis; Kyle R. Saterthwaite; Ade & Company Inc (57) ABSTRACT

A material decelerating device is connected in series with a distribution tube in proximity to a material outlet in an agricultural air distribution system for decelerating conveying air which placing material into a furrow in the ground. The material decelerating includes an inlet tube connected to the distribution tube to receive material and conveying air therefrom. The inlet tube is connected at an intermediate location on a center tube of the device which exhausts the air upwardly to an exhaust opening and deposits the material downwardly through an outlet opening. A cap adjustably spans the exhaust opening to vary the amount of air exhausted. The inlet tube is inclined downwardly in alignment with a helical recessed channel within the center tube to guide material to the outlet.

13 Claims, 9 Drawing Sheets

FIG. 9

DECELERATING DEVICE FOR AIR CONVEYED MATERIAL

This application claims the benefit under 35 U.S.C. 119(e) of U.S. provisional application Ser. No. 61/548,244, filed Oct. 18, 2011 and U.S. provisional application Ser. No. 61/494,964, filed Jun. 9, 2011.

FIELD OF THE INVENTION

The present invention relates to a material decelerating device for use in an agricultural air distribution system which pneumatically conveys particulate material (for example seed and fertilizer) through distribution tubes, and more particularly the present invention relates to a material decelerating device, which can be connected between a distribution tube of the air distribution system and a material outlet on a furrow opener for exhausting the conveying air through a separate opening in the device from the particulate material deposited into the material outlet, for example as in a conical separator type device.

BACKGROUND

In agriculture, it is common to make use of air distributions systems for delivery of seed or fertilizer to furrows formed in the ground by respective furrow openers of a suitable implement. As the force of air exiting distribution tubes of the air distribution system can inadvertently cause the material being distributed to be blown out of the furrow, the use of the various types of material decelerating devices are known. Two examples of material decelerating devices are described in U.S. Pat. No. 7,509,915 by Memory and U.S. Pat. No. 4,493,273 by Gauchet et al. In each instance, a cyclonic separator is used to separate the material being conveyed from the conveying air stream. Using the designs of the prior art however, lighter materials can be caught in the conical air flow and inadvertently exhausted out of the upper air vent instead of the product delivery opening at the bottom end. In other instances, the material being conveyed may be trapped within the cyclonic flow of air within the separator.

US Patent Application Publication 2002/0144637 by Wendling et al. discloses a further example of a cyclonic separator in an agricultural air distribution system in which the interior of the cyclonic chamber includes a helical groove formed therein. The groove is very shallow relative to the overall diameter of the chamber such that most of the air flow is not affected by the groove and material may still spin uncontrollably within the cyclonic air flow instead of being assisted by the groove to the material outlet at the bottom. Furthermore, the material and air inlet enters the cyclonic chamber within a plane which is near perpendicular to the axial direction of the chamber such that the air flow may be substantially circular and lighter materials may eventually be exhausted through the upper vent opening instead of the lower material outlet as in the prior art examples noted above.

SUMMARY OF THE INVENTION

According to a first aspect of the invention there is provided a material decelerating device for use with an agricultural air distribution system having a distribution tube arranged for connection to a material outlet for placing material conveyed by air into a furrow in the ground, the material decelerating device comprising:

a center tube extending in a longitudinal direction between an upper end and a lower end;

an inlet tube having an upper end arranged to connect to the distribution tube and a lower end in communication with the center tube at an intermediate location between the upper and lower ends of the center tube so as to be arranged to deposit material and conveying air received from the distribution tube into the center tube;

the lower end of the center tube having a lower opening therein and being arranged to communicate with the material outlet so as to be arranged to deposit material received from the inlet tube into the material outlet;

the upper end of the center tube having an upper opening therein and being arranged to exhaust conveying air received from the inlet tube therethrough; and a cap portion including a guard member spanning across the upper opening at a location spaced above the upper end of the center tube so as to define a portion of the upper opening between the guard member and the upper end of the center tube;

the cap portion being adjustable relative to the center tube so as to be arranged to vary a size of the upper opening.

The adjustable mounting of a cap portion including a guard member spanning above the upper opening provides the advantages of both: i) protecting the center tube from debris (e.g. rain and the like) which could cause plugging, and ii) permitting the cross sectional flow area of the upper exhaust opening to be adjusted. The upper vent opening size can thus be matched to the air flow rate into the material decelerator for optimizing the performance according to different operating conditions and different equipment being used. The upper vent opening size can thus be adjusted to ensure sufficient exhausting of air to decelerate the downward flow of the seed while also preventing too much exhausting through the upper vent opening which might cause seed to escape upwardly therethrough.

Preferably the cap portion is supported above the upper end of the center tube so as to define a generally annular exhaust portion of the upper opening between the guard member and the upper end of the center tube.

According to a preferred embodiment, the cap portion is adjustable in height relative to the upper end of the center tube so as to vary a cross sectional flow area of the portion of upper opening between the guard member and the upper end of the center tube as a height of the guard member is adjusted relative to the center tube.

The cap portion is preferably secured to the center tube by an adjustable threaded connection.

Preferably the device further comprises a shoulder on the center tube and a plurality of selectively separable annular spacers arranged to be clamped within the threaded connection between the cap portion and the shoulder on the center tube such that the cap portion is arranged to be secured to the center tube at a plurality of different heights, each corresponding to a different size of the upper opening and a different configuration of spacers clamped between the cap portion and the shoulder on the center tube.

According to a further embodiment, when the cap portion further includes a sleeve portion so as to define an annular exhaust portion of the upper opening between the guard member and the upper end of the center tube and a tubular portion of the upper opening communicating through the sleeve portion, the cap portion may be readily interchanged with other cap portions of like configuration in which the cap portions define upper openings having different cross sectional areas relative to one another.

The device may further comprise a recessed channel formed on the center tube which is recessed in an outward radial direction in relation to an inner surface of the center tube and which extends helically downward from the lower end of the inlet tube towards the lower end of the center tube, wherein the recessed channel has a depth adjacent an upper end of the recessed channel in the outward radial direction from the inner surface of the center tube which is at least 20% of an inner diameter of the inner surface of the center tube adjacent to the upper end of the recessed channel.

The device may further be arranged such that the upper end of the inlet tube extends at an inclination of less than 45 degrees from the longitudinal direction of the center tube.

When provided in combination with an implement shank supporting a furrow opener which supports the material outlet thereon, the device is preferably supported only by connection of the lower end of the center tube with the outlet member on the furrow opener and connection of the inlet tube to the distribution tube.

The center tube may further comprise:

an upper portion surrounded by an upper portion of the recessed channel having a closed inner side such that the upper portion of the center tube and the upper portion of the recessed channel do not directly communicate with one another; and a lower portion surrounded by a lower portion of the recessed channel having an open inner side such that the lower portion of the recessed channel is in open communication with the center tube.

According to a second aspect of the present invention there is provided a material decelerating device for use with an agricultural air distribution system having a distribution tube arranged for connection to a material outlet for placing material conveyed by air into a furrow in the ground, the material decelerating device comprising:

a center tube extending in a longitudinal direction between an upper end and a lower end;

an inlet tube having an upper end arranged to connect to the distribution tube and a lower end in communication with the center tube at an intermediate location between the upper and lower ends of the center tube so as to be arranged to deposit material and conveying air received from the distribution tube into the center tube;

the lower end of the center tube having a lower opening therein and being arranged to communicate with the material outlet so as to be arranged to deposit material received from the inlet tube into the material outlet;

the upper end of the center tube having an upper opening therein and being arranged to exhaust conveying air received from the inlet tube therethrough; and a recessed channel formed on the center tube which is recessed in an outward radial direction in relation to an inner surface of the center tube and which extends helically downward from the lower end of the inlet tube towards the lower end of the center tube;

the recessed channel having a depth adjacent an upper end of the recessed channel in the outward radial direction from the inner surface of the center tube which is at least 20% of an inner diameter of the inner surface of the center tube adjacent to the upper end of the recessed channel.

By arranging the helical recessed channel to be very deep relative to the overall diameter of the center tube, a significant portion of the air flow is directed within the recessed channel to maintain the flow of material substantially within the helical path of the recessed channel instead of being exhausted upwardly with the air. The depth of the recessed channel further prevents uncontrolled spinning of lighter materials within the body of the center tube so that the material can be delivered through the material outlet at a more controllable rate.

The depth of the recessed channel adjacent the upper end is preferably approximately 50% of the inner diameter of the inner surface of the center tube adjacent to the upper end of the recessed channel.

Preferably the depth of the recessed channel in the outward radial direction from the inner surface of the center tube is gradually reduced from the upper end towards a lower end of the recessed channel.

The recessed channel may be substantially semicircular in shape.

Preferably the recessed channel extends helically downward at an inclination of less than 70 degrees from the longitudinal direction of the center tube.

According to another aspect of the present invention there is provided a material decelerating device for use with an agricultural air distribution system having a distribution tube arranged for connection to a material outlet for placing material conveyed by air into a furrow in the ground, the material decelerating device comprising:

a center tube extending in a longitudinal direction between an upper end and a lower end;

an inlet tube having an upper end arranged to connect to the distribution tube and a lower end in communication with the center tube at an intermediate location between the upper and lower ends of the center tube so as to be arranged to deposit material and conveying air received from the distribution tube into the center tube;

the lower end of the center tube having a lower opening therein and being arranged to communicate with the material outlet so as to be arranged to deposit material received from the inlet tube into the material outlet;

the upper end of the center tube having an upper opening therein and being arranged to exhaust conveying air received from the inlet tube therethrough; and the upper end of the inlet tube being oriented to extend at an inclination of less than 45 degrees from the longitudinal direction of the center tube.

According to a further aspect of the present invention there is provided a material decelerating device in combination with an implement shank supporting a furrow opener having material outlet thereon for placing material into a furrow formed in the ground by the furrow opener and an agricultural air distribution system including a distribution tube arranged for connection to the material outlet to convey material to the material outlet by air, the material decelerating device comprising:

a center tube extending in a longitudinal direction between an upper end and a lower end;

an inlet tube having an upper end arranged to connect to the distribution tube and a lower end in communication with the center tube at an intermediate location between the upper and lower ends of the center tube so as to be arranged to deposit material and conveying air received from the distribution tube into the center tube;

the lower end of the center tube having a lower opening therein and being arranged to communicate with the material outlet so as to be arranged to deposit material received from the inlet tube into the material outlet;

the upper end of the center tube having an upper opening therein and being arranged to exhaust conveying air received from the inlet tube therethrough; and a recessed channel formed on the center tube which is recessed in an outward radial direction in relation to an inner surface of the center tube and which extends helically downward from the lower end of the inlet tube towards the lower end of the center tube;

the device being supported only by connection of the lower end of the center tube with the outlet member on the furrow opener and connection of the inlet tube to the distribution tube.

By arranging the upper end of the inlet tube at a steep angle near the axial direction of the center tube, the material decelerating device has a compact body which is well suited for mounting in series with an air distribution tube adjacent a furrow opener in a suitable agricultural implement. The compact design of the center tube and the steep angle of the adjacent inlet tube is also well suited to being fully supported by only connection to the distribution tube of the air distribution system thereabove and the material outlet carried on the body of the furrow opener therebelow such that the device is moveable together with the opener relative to the tool bar of the implement carrying various openers thereon.

According to yet another aspect of the present invention there is provided a material decelerating device for use with an agricultural air distribution system having a distribution tube arranged for connection to a material outlet for placing material conveyed by air into a furrow in the ground, the material decelerating device comprising:

a center tube extending in a longitudinal direction between an upper end and a lower end;

an inlet tube having an upper end arranged to connect to the distribution tube and a lower end in communication with the center tube at an intermediate location between the upper and lower ends of the center tube so as to be arranged to deposit material and conveying air received from the distribution tube into the center tube;

the lower end of the center tube having a lower opening therein and being arranged to communicate with the material outlet so as to be arranged to deposit material received from the inlet tube into the material outlet;

the upper end of the center tube having an upper opening therein and being arranged to exhaust conveying air received from the inlet tube therethrough; and a recessed channel formed about the center tube which is recessed in an outward radial direction in relation to an inner surface of the center tube and which extends helically downward from the lower end of the inlet tube towards the lower end of the center tube;

the center tube including:

an upper portion comprising a closed peripheral wall surrounded by an upper portion of the recessed channel having a closed inner side such that the upper portion of the center tube and the upper portion of the recessed channel do not directly communicate with one another; and a lower portion surrounded by a lower portion of the recessed channel having an open inner side such that the lower portion of the recessed channel is in open communication with the center tube.

A length of the upper portion of the center tube between the lower portion and the upper end of the center tube is preferably near a length of the lower portion of the center tube between the upper portion and the lower end of the center tube.

The upper portion of the center tube may be open and unrestricted between the lower portion and the upper end of the center tube.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures, there is illustrated a material decelerating device generally indicated by reference numeral 10. The device 10 is particularly suited for use with the air distribution system of an appropriate agricultural implement for placing particulate material within respective furrows formed in the ground.

Although two embodiments are shown in the accompanying figures, the common features of the two embodiments will first be described herein.

Figure 1:
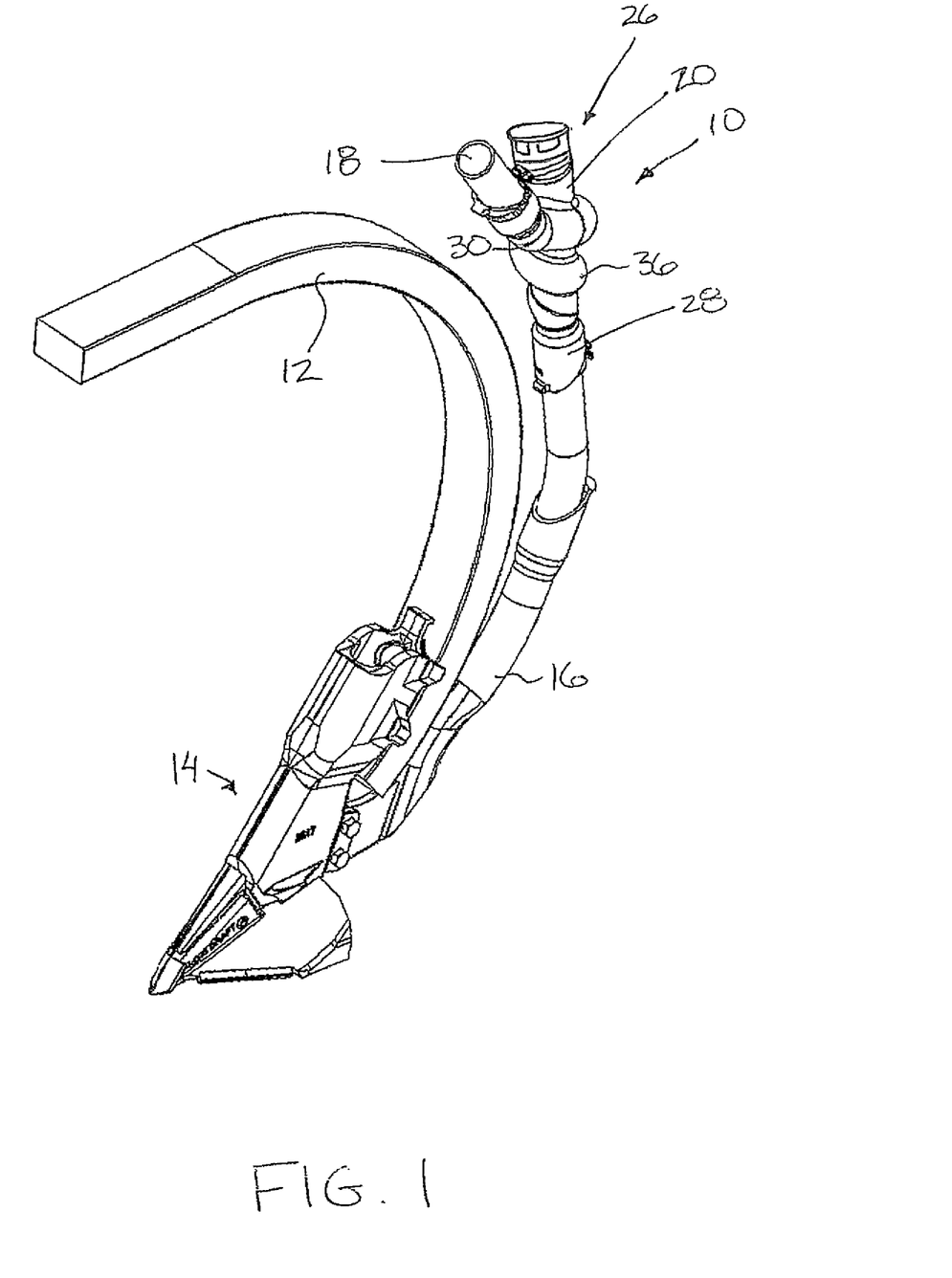
FIG. 1 is a perspective view of a first embodiment of the material decelerating device supported on the material outlet of a furrow opener on an implement shank of a suitable agricultural implement according to a first embodiment of the present invention.
Figure 2:
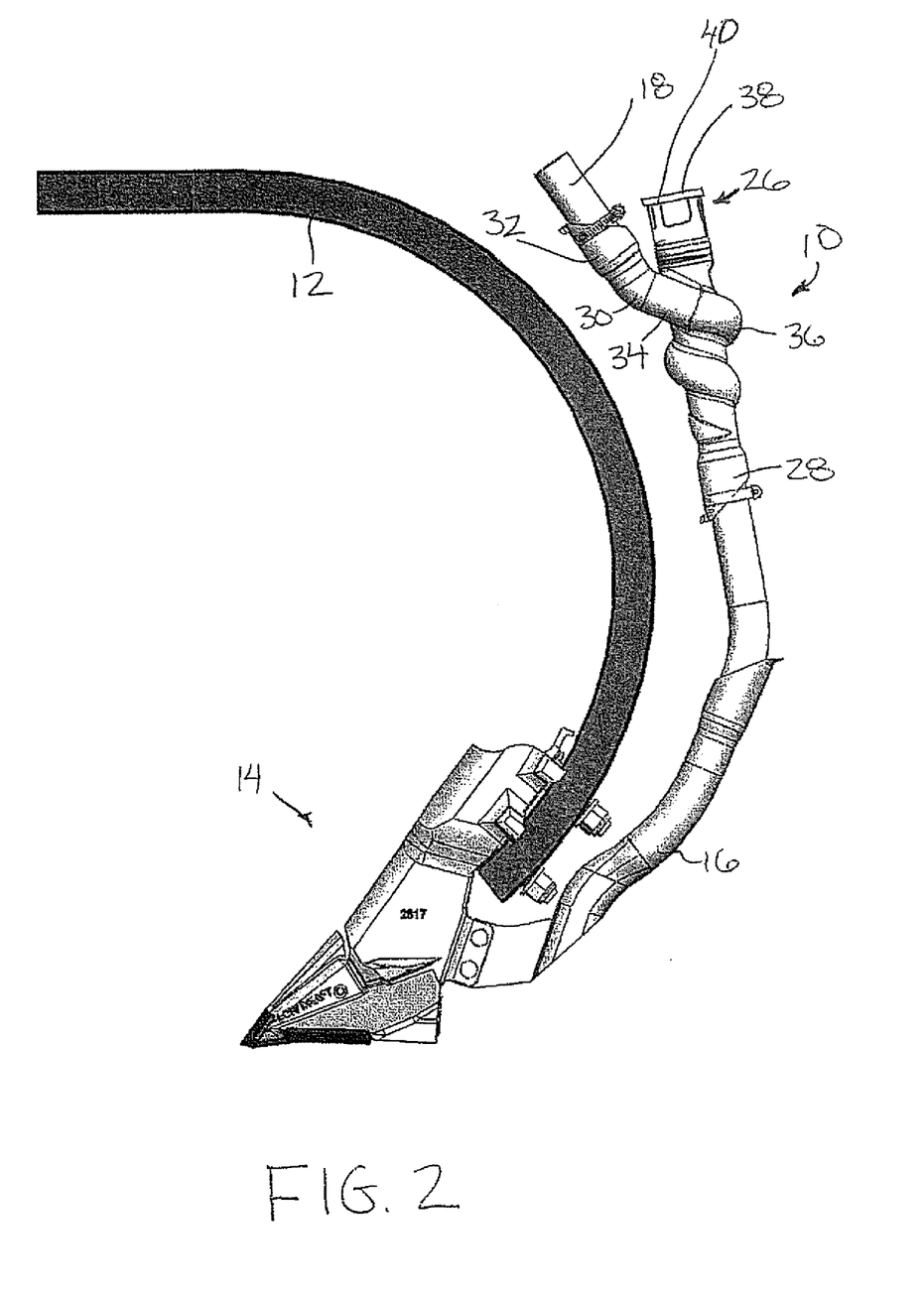
FIG. 2 is a side elevational view of the material decelerating device according to FIG. 1 supported on the material outlet of the furrow opener.
Figure 3:
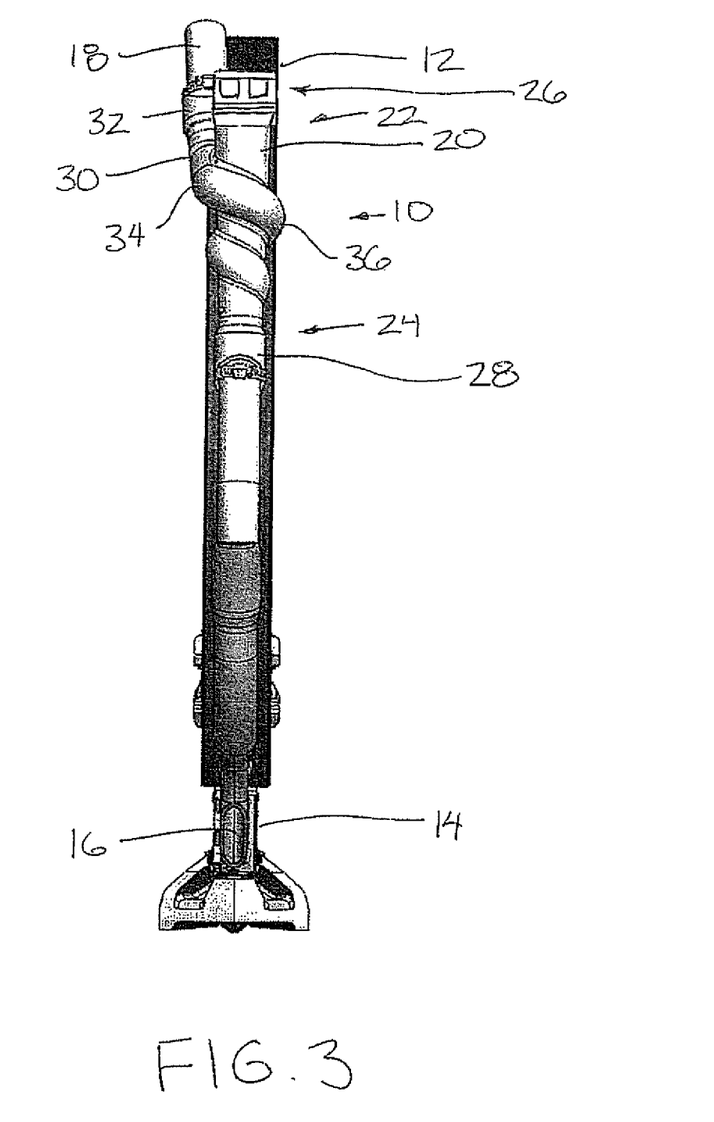
FIG. 3 is a rear elevational view of the material decelerating device according to FIG. 1 supported on the material outlet of the furrow opener.
Figure 4:
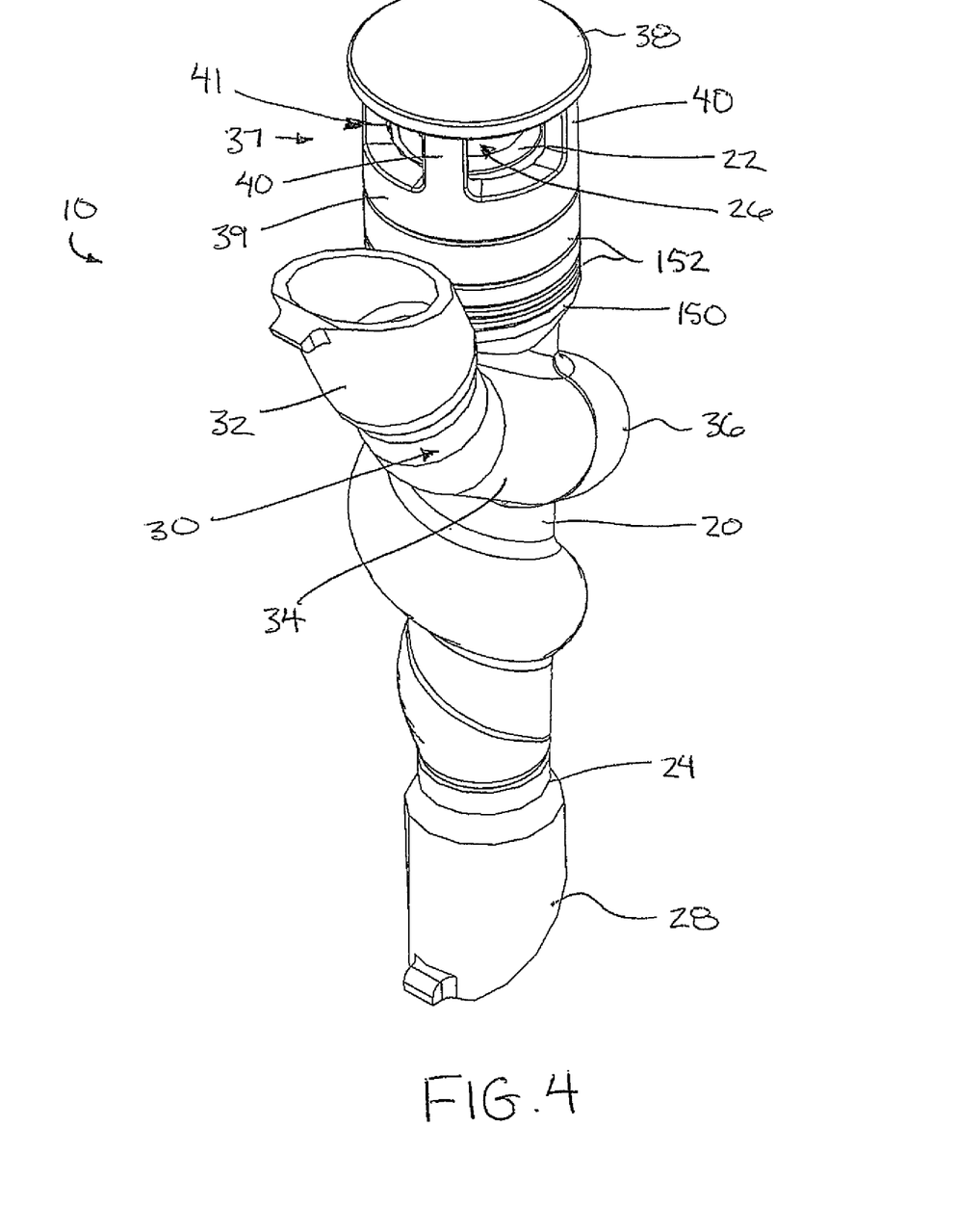
FIG. 4 is a perspective view of the material decelerating device according to FIG. 1.
Figure 5:
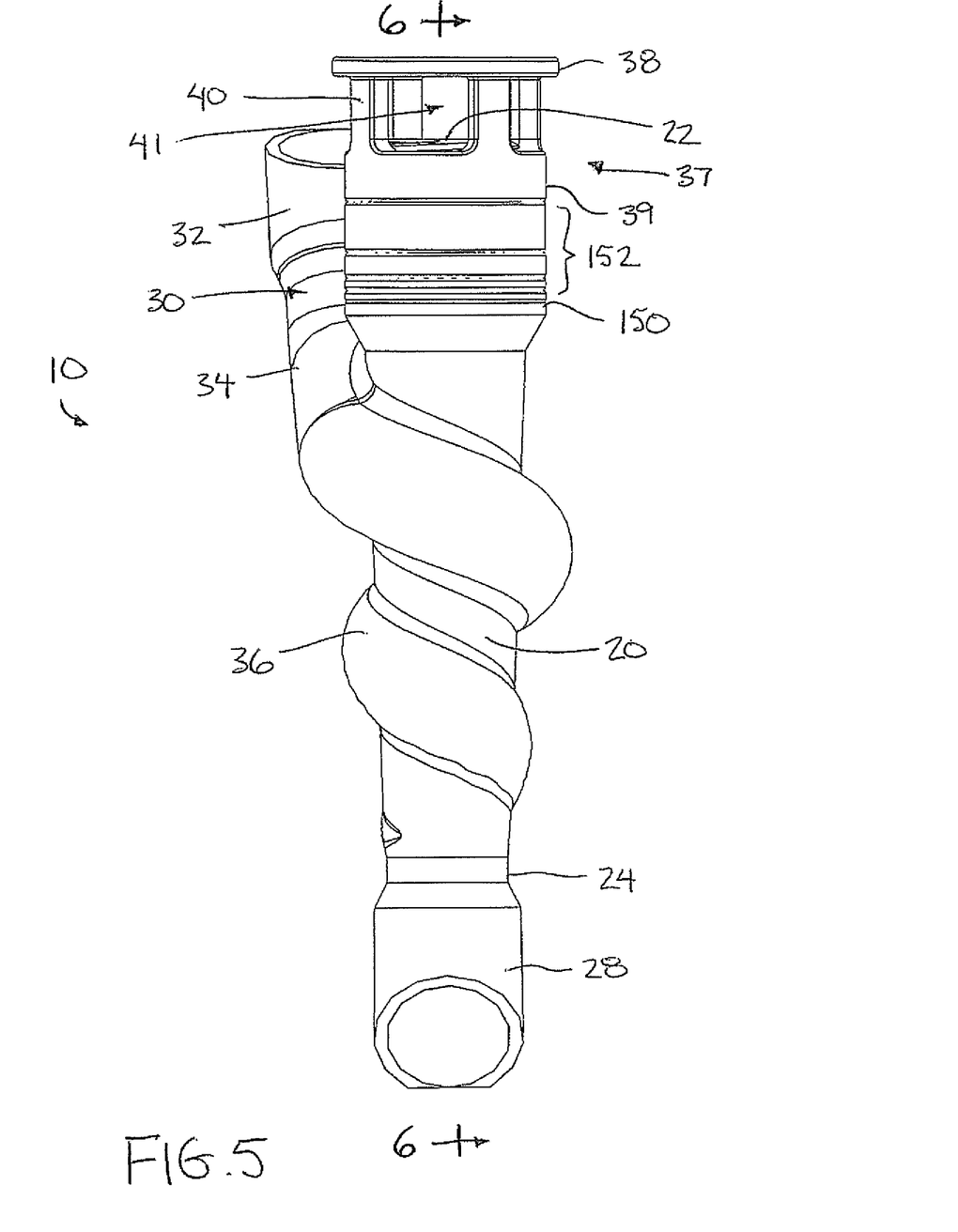
FIG. 5 a side elevational view of the material decelerating device according to FIG. 1.
Figure 6:
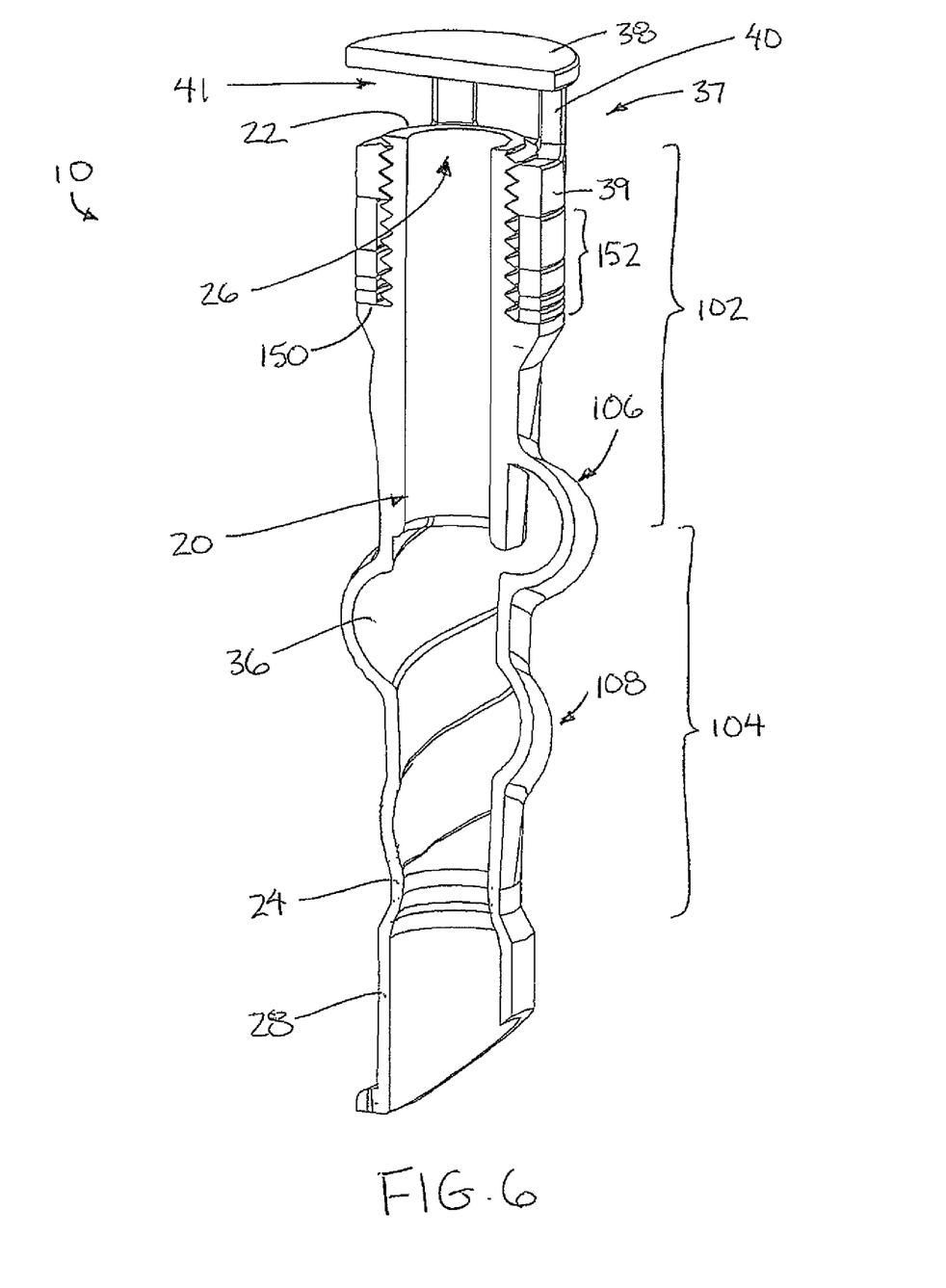
FIG. 6 is a cross sectional view along the line 6-6 of FIG. 5.
Figure 7:
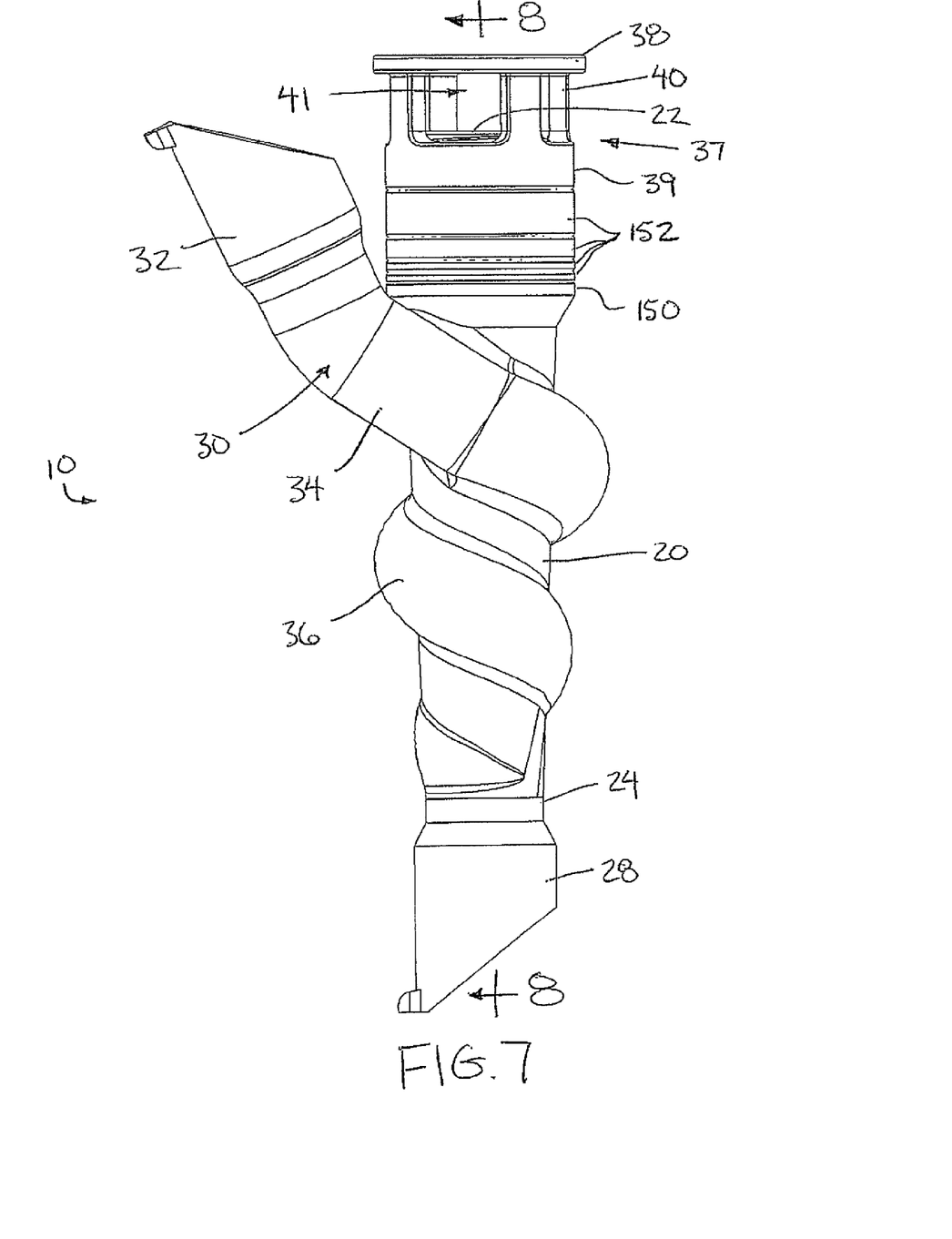
FIG. 7 a side elevational view of the material decelerating device according to FIG. 1.
Figure 8:
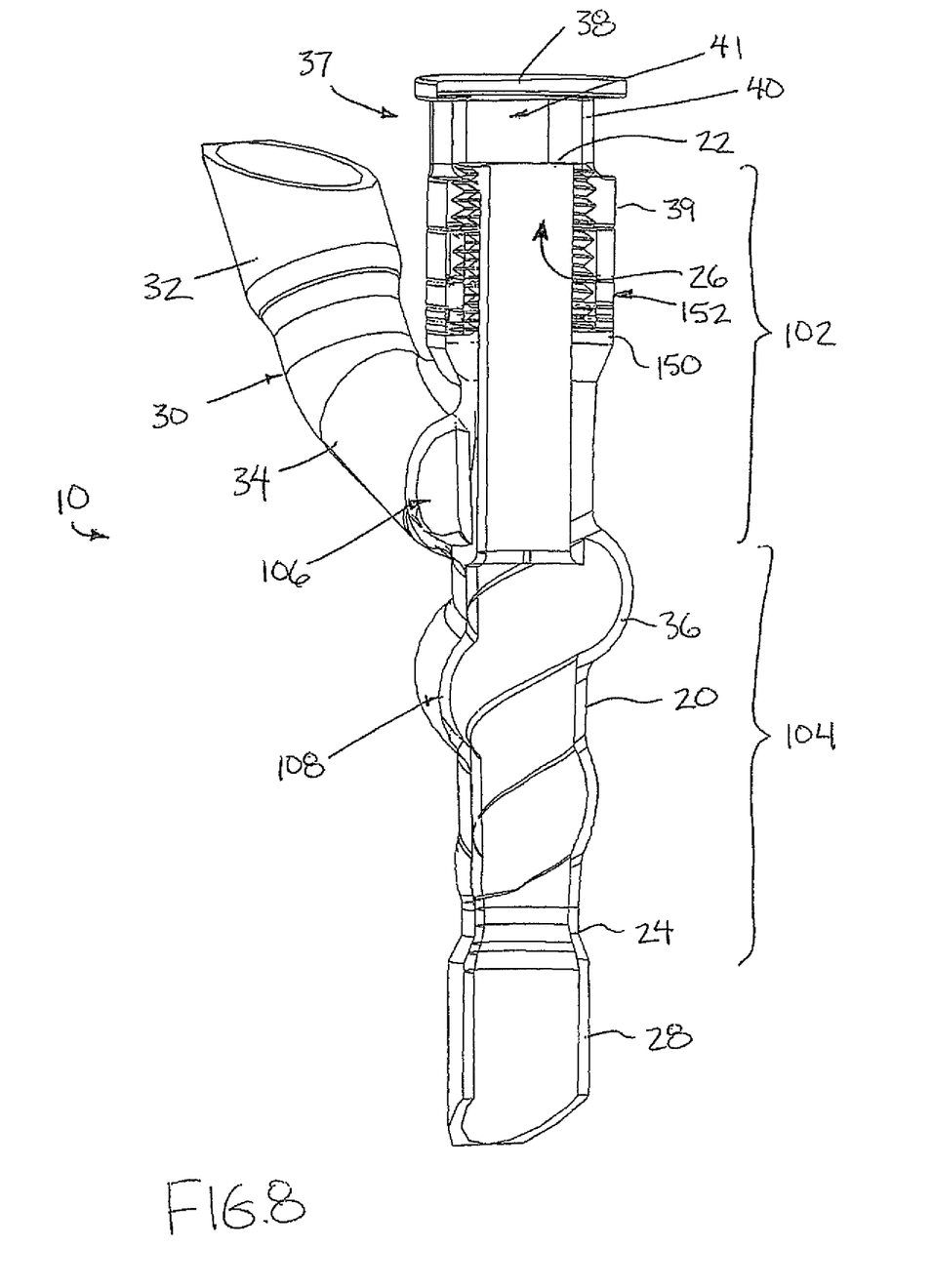
FIG. 8 is a cross sectional view along the line 8-8 of FIG. 7.

A suitable implement typically comprises a tool bar arranged to be towed across the ground by a tractor or the like. The tool bar supports a plurality of implement shanks 12 thereon in which each shank supports a respective furrow opener 14 such that the furrow opener is resiliently suspended from the tool bar. The furrow opener 14 includes at least one material outlet 16 suitable for depositing particulate material therethrough into the furrow formed by the opener 14, for example seed or fertilizer or a combination thereof.

Typically the air distribution system includes a blower for generating a flow of conveying air through a series of distribution tubes 18 of the system. The distribution tubes convey the particulate material under force of air from the blower therethrough to the material outlets 16 of the respective openers 14. The material decelerating device 10 is arranged for mounting in series with the distribution tube 18 associated with a respective opener 14 such that a body of the device is supported in proximity to the implement shank supporting the opener thereon such that the device is substantially directly above the material outlet of the opener. Typically, the body of the device is supported solely by connection to the air distribution tube 18 thereabove and the material outlet 16 of the respective opener to which it is connected therebelow. Accordingly, the device 10 is arranged for movement together with the respective opener relative to the ground and the tool bar upon which the furrow opener is resiliently supported.

The device 10 generally comprises a center tube 20 which is elongate in an axial or longitudinal direction between an upper end 22 and a lower end 24. The center tube is generally circular in cross section from the upper end defining an upper opening 26 for exhausting conveying air upwardly therethrough to a lower end portion 28.

The lower end portion 28 in the form of a mounting collar projecting axially beyond the lower end of the main portion of the tube 20. The lower end portion 28 is suitable for receiving a portion of air distribution tube therein such that the other end of said portion of the air distribution tube can be coupled to the upper end of the material outlet of the opener.

The material outlet of the opener typically comprises an upright rigid tube having an upper end supporting the device 10 thereabove and having a lower end in alignment with the furrow formed by the opener. The tube portion connecting the lower end portion 28 of the device 10 to the material outlet can be clamped to the material outlet and the lower end portion in a conventional manner using suitable tube clamps.

The center tube 20 further includes an upper portion 102 and a lower portion 104 extending in the longitudinal direction coaxially and in series one above the other. The inner surface of the upper portion 102 comprises a closed peripheral wall remaining enclosed and having a constant inner diameter between the lower portion 104 and the upper end 22 of the centre tube.

The upper portion 102 of the center tube is open and unrestricted between the lower portion 104 and the upper end 22 of the center tube. Length of the upper portion of the center tube between the lower portion and the upper end of the center tube is near a length of the lower portion of the center tube between the upper portion and the lower end of the center tube.

In the lower portion 104, the diameter is reduced from an upper end which is larger than the upper portion 102 to a lower end which is near the diameter of the upper portion 102 at a substantially constant linear rate. The taper is very slight such that the walls of the center tube are angled inwardly from the upper end to the lower end at an inclination in the range of 2 to 3 degrees from the axial direction.

The device 10 further comprises an inlet tube 30 defining a passage extending from an upper end 32 to a lower end 34. The passage through the inlet tube is generally circular in cross section between the upper and lower ends.

The upper end 32 of the inlet tube also defines a mounting collar for mating connection with the bottom end of the air distribution tube of the respective opener. As noted above, a conventional tube clamp may be used to secure the distribution tube to the upper end of the inlet tube. The mounting collar defining the upper end 32 of the inlet tube in the illustrated embodiment is oriented at an inclination of approximately 45 degrees from the longitudinal or axial direction of the center tube resulting in the compact configuration of the device.

The inlet tube transitions in inclination from the upper end to a lower end which joins the center tube at the periphery thereof so as to be oriented generally in the tangential or circumferential direction at the connection of the inlet tube to the center tube and so as to have an inclination from the axial direction which is approximately 60 degrees. The lower end 34 of the inlet tube joins the center tube at an intermediate location thereon spaced below the upper end portion, but closer to the upper end than the lower end thereof. The inlet tube is aligned with the center tube such that a central axis of the inlet tube is substantially aligned with a plane of the inner surface of the center tube at the point of communication between the inlet tube and the center tube.

The portion of the inlet tube protruding outwardly from the plane of the wall of the center tube transitions into a helical recessed channel 36 formed in the inner surface of the center tube which is inclined downwardly in the circumferential direction that the inlet tube joins the center tube. The inclination of the recessed channel is approximately 60 degrees from the axial direction of the center tube similar to the inclination of the lower end of the inlet tube. The inclination remains substantially constant between the top and bottom ends of the recessed channel.

The recessed channel 36 is initially defined by the portion of the inlet tube protruding outward beyond the inner wall of the center tube and then continues to be substantially semi-circular in shape or profile along the length thereof between top and bottom ends.

More particularly, the recessed channel 36 includes an upper portion 106 about the upper portion 102 of the center tube and a lower portion 108 about the lower portion 104 of the center tube. As the upper portion 102 of the center tube comprises a closed peripheral wall, the upper portion 106 of the recessed channel has a closed inner side such that the upper portion of the center tube and the upper portion of the recessed channel do not directly communicate with one another. The upper portion 106 of the channel is thus an enclosed passage between the inlet tube and the lower portion 108 of the channel.

The depth of the recessed channel is measured as an outward radial distance from the inner surface of the center tube. At the top end of the recessed channel, the depth of the recessed channel is equal to approximately 50% of the internal diameter of the center tube adjacent the upper end at the corresponding elevation. The recessed channel 36 is initially defined by the portion of the inlet tube protruding outward beyond the inner wall of the center tube and then continues to be substantially semi-circular in shape or profile along the length thereof between top and bottom ends. The depth of the recessed channel is gradually reduced from the top end to the bottom end of the recessed channel until the depth of the recessed channel is substantially reduced to zero at the bottom end of the center tube where the center tube joins the lower end portion.

A cross sectional area taken along a plane perpendicular to the flow direction of the passage of the inlet tube is initially gradually reduced from the full circular cross section of the upper end 32 to the semi-circular cross section of the lower end 34. The lower end of the inlet tube 34 is substantially identical in cross sectional area to the inlet end of the recessed channel 36 due to the transition therebetween, but the cross sectional area (perpendicular to the flow direction) of the recessed channel 36 then continues to be reduced along the upper portion 106 towards the lower portion.

The inner side of the recessed channel between the upper portion 106 and the lower portion 108 gradually opens up to the interior of the center tube across the transition from the upper portion 102 to the lower portion 104 of the center tube. The lower portion 108 of the recessed channel accordingly has an open inner side along the length thereof such that the lower portion of the recessed channel is in open communication with the center tube as the cross sectional area of the recessed channel is reduced to zero at the bottom end of the center tube. The flow of air and seed is thus gradually transitioned from a combined downward helical flow at the inlet tube to a downward helical flow of the seed through the recessed channel to the bottom end of the center tube and a split axial airflow through both top and bottom ends of the center tube.

The device 10 further comprises a cap portion 37 which supports a guard member 38 thereon to function as a rain shield across the upper opening. The guard member 38 generally comprises a circular plate oriented perpendicularly to the longitudinal or axial direction of the center tube at a location spaced axially outward from the upper end portion to define an annular portion 41 of the upper opening 22 between the guard member and the upper end of the center tube. The circular plate has an outer diameter which is greater than the maximum outer diameter of the center tube to ensure that the guard member fully spans across the upper opening even when the center tube is in an upright orientation offset slightly from vertical.

The cap portion 37 further comprises a mounting portion 39 arranged to be secured to the upper end of the center tube by a threaded connection and a plurality of legs 40 which are connected between the mounting portion and the circular plate forming the guard member 38 at a plurality of circumferentially spaced positions so that the guard member remains fixed relative to the mounting portion at a location spaced axially outward therefrom. The guard member prevents access of rain into the upper opening. This prevent rain from mixing with the particulate material to be conveyed through the material decelerated device which then interferes with the conveying of the material and can cause plugging.

The cap portion 37 is adjustably mounted on the upper end of the center tube in a manner which allows the size of the upper opening, and more particularly the minimum cross sectional area perpendicular to the flow direction of the upper opening to be adjusted to accommodate different operating conditions. A first embodiment according to FIGS. 4 through 8 and a second embodiment according to FIG. 9 for adjusting the size of the upper opening will now be described.

Turning now to the embodiment of FIGS. 4 through 8, the mounting portion 39 in this instance comprises a sleeve which is internally threaded for being secured externally about the outer diameter of the upper end of the center tube. The center tube in this instance includes a shoulder 150 formed externally thereon at a location spaced axially inwardly from the upper end which defines an annular surface perpendicular to the axial direction of the center tube. The outer diameter of the center tube between the shoulder 150 and the upper end comprises a substantially constant diameter which is externally threaded for forming the threaded connection with the mounting portion of the cap portion 37.

A plurality of annular spacer members 152 are provided which have inner and outer diameters corresponding approximately to the inner and outer diameter of the shoulder 150 for mounting in series abutment with one another along the externally threaded portion of the center tube clamped within the threaded connection between the shoulder 150 and the mounting portion of cap portion 37 mounted on the upper end of the center tube. The spacer members can be internally threaded for threaded connection onto the center tube also. Some of the annular spacers have different thickness relative to one another in the axial direction.

The annular spacer members are readily removable and interchangeable with one another by unthreading the cap portion from the center tube. By mounting the cap portion in abutment with different configurations of spacer members mounted about the center tube, the threaded connection of the cap portion can be tightened at a plurality of different axial positions along the threaded portion of the center tube. Each different axial position corresponds to a different height or distance of the guard member 38 relative to the upper end of the center tube.

When mounted at an outermost position, the annular space between the outer end of the collar forming the mounting portion 39 of the collar and the circular plate forming the guard member defines the maximum cross sectional area of the upper opening of the center tube due to the fixed configuration of the legs spanning between the mounting portion and the guard member. When annular spacer members are removed and the mounting portion is tightened onto the center tube such that the guard member is nearer to the upper end of the center tube, the upper end of the center tube projects axially outward beyond the outer end of the collar forming the mounting portion such that the upper end of the center tube projects into the annular exhaust portion of the upper opening to reduce the size of the annular exhaust portion. Adjustment of the height of the cap portion relative to the upper end of the center tube thus varies a cross sectional flow area of the annular exhaust portion of upper opening between the guard member and the upper end of the center tube.

Figure 9:
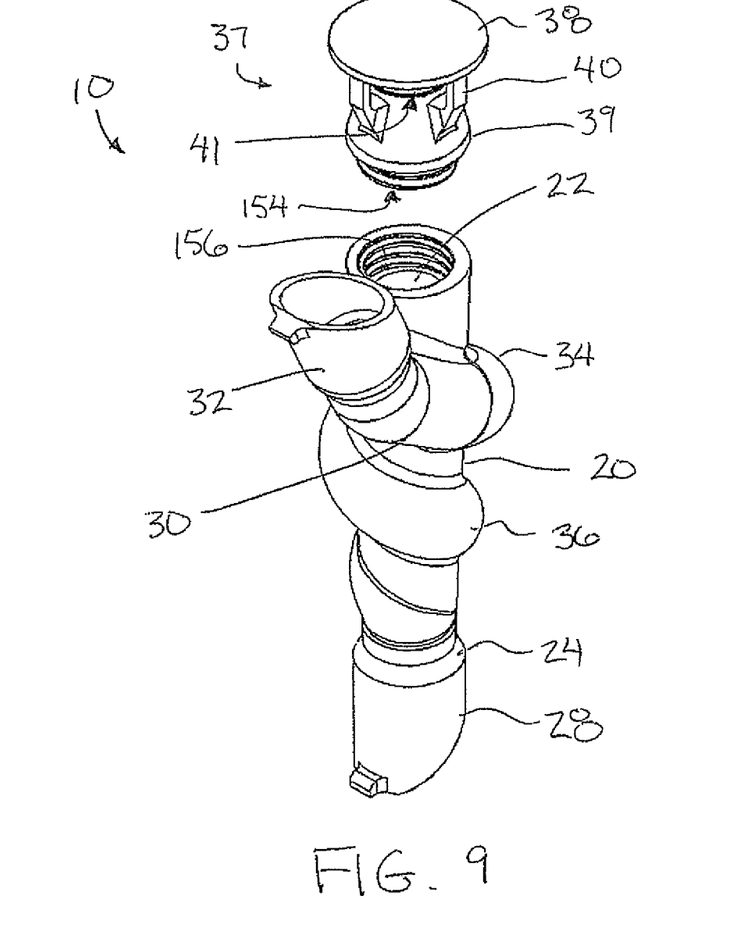
FIG. 9 is a perspective view of a second embodiment of the material decelerating device.

Turning now to the embodiment of FIG. 9, in this instance, the upper end 22 of the center tube is internally threaded for threadably receiving the cap portion 37 therein. The cap portion 37 thus comprises a sleeve having a passage extending axially therethrough in alignment and in communication with the passage through the center tube which defines a tubular exhaust portion 154 of the upper opening of the center tube. A lower portion of the sleeve forming the mounting portion 39 is externally threaded for connection to an internally threaded portion 156 at the upper end 22 of the centre tube.

The guard member 38 is similar in configuration as the previous embodiments so as to be supported by legs 40 which are connected to the upper end 22 of the center tube and the plate forming the guard member 38 so that the guard member remains fixed relative to the mounting portion 39 of the cap portion 37 at a location spaced axially outward therefrom. Similar to the previous embodiment, the guard portion, the mounting portion and the legs of the cap portion 37 are readily separable together from the center tube. In this instance, a kit of plural cap portions 37 can be provided, each having a different cross sectional flow area of the respective upper opening therethrough.

In one instance the different flow areas may be accomplished by providing tubular exhaust portions 154 through the sleeve of the mounting portion having different diameters therethrough such that the cross sectional area of the flow passage through each top portion is different than the other top portions.

Alternatively, the different flow areas may be accomplished by providing guard members mounted at different spacings relative to the mounting portion to vary the cross sectional area of the annular exhaust portion between the different interchangeable cap portions 37.

The cap portions 37 are otherwise identical such that each sleeve is provided with a respective guard member 38 and a lower threaded portion for threaded connection into the upper end of the center tube. The cap portions are thus readily interchangeable with one another on the center tube to match the upper vent opening size to the air flow rate into the material decelerator.

In use, the material decelerating device is simply connected in series with an existing air distribution tube directed to a respective opener such that the device 10 is supported in proximity to the material outlet of the respective opener and is arranged to be supported solely by the connection to the material outlet of the opener and to the air distribution tube thereabove. When material is conveyed through the air distribution tube towards the material outlet of the opener, the particulate material and conveying air together enter through the inlet tube to be directed into the helical path of the recessed channel in the inner surface of the center tube.

The large depth of the recessed channel relative to the diameter of the center tube ensures that the large majority of the air flow and material conveyed thereby is directed along the helical recessed channel which gradually reduces in depth such that the conveying air is gradually exhausted upwardly through the center. The material directed downwardly by the recessed channel exits through the lower opening at the bottom of the center tube. The material is subsequently deposited into a connecting distribution tube joined to the material outlet of the opener therebelow for subsequent depositing into the furrow of the opener.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A material decelerating device for use with an agricultural air distribution system having a distribution tube arranged for connection to a material outlet for placing material conveyed by air into a furrow, the material decelerating device comprising:
    a center tube extending in a longitudinal direction between an upper end and a lower end;
    an inlet tube having an upper end arranged to connect to the distribution tube and a lower end in communication with the center tube at an intermediate location between the upper and lower ends of the center tube so as to be arranged to deposit material and conveying air received from the distribution tube into the center tube;
    the lower end of the center tube having a lower opening therein and being arranged to communicate with the material outlet so as to be arranged to deposit material received from the inlet tube into the material outlet;
    the upper end of the center tube having an upper opening therein and being arranged to exhaust conveying air received from the inlet tube therethrough; and
    a cap portion including a guard member spanning across the upper opening at a location spaced above the upper end of the center tube so as to define a portion of the upper opening between the guard member and the upper end of the center tube;
    the cap portion being adjustable relative to the center tube so as to be arranged to vary a size of the upper opening.

2. The device according to claim 1 wherein the cap portion is supported above the upper end of the center tube so as to define a generally annular exhaust portion of the upper opening between the guard member and the upper end of the center tube.

3. The device according to claim 1 wherein the cap portion is adjustable in height relative to the upper end of the center tube so as to vary a cross sectional flow area of the portion of upper opening between the guard member and the upper end of the center tube as a height of the guard member is adjusted relative to the center tube.

4. The device according to claim 1 wherein the cap portion is secured to the center tube by an adjustable threaded connection.

5. The device according to claim 4 wherein there is provided a shoulder on the center tube and a plurality of selectively separable annular spacers arranged to be clamped within the threaded connection between the cap portion and the shoulder on the center tube such that the cap portion is arranged to be secured to the center tube at a plurality of different heights, each corresponding to a different size of the upper opening and a different configuration of spacers clamped between the cap portion and the shoulder on the center tube.

6. The device according to claim 1 wherein the cap portion further includes a sleeve portion so as to define an annular exhaust portion of the upper opening between the guard member and the upper end of the center tube and a tubular portion of the upper opening communicating through the sleeve portion, and wherein the cap portion is readily interchanged with other cap portions of like configuration in which the cap portions define upper openings having different cross sectional areas relative to one another.

7. The device according to claim 1 wherein there is provided a recessed channel formed on the center tube which is recessed in an outward radial direction in relation to an inner surface of the center tube and which extends helically downward from the lower end of the inlet tube towards the lower end of the center tube;
    the recessed channel having a depth adjacent an upper end of the recessed channel in the outward radial direction from the inner surface of the center tube which is at least 20% of an inner diameter of the inner surface of the center tube adjacent to the upper end of the recessed channel.

8. The device according to claim 7 wherein the depth of the recessed channel adjacent the upper end is approximately 50% of the inner diameter of the inner surface of the center tube adjacent to the upper end of the recessed channel.

9. The device according to claim 7 wherein the depth of the recessed channel in the outward radial direction from the inner surface of the center tube is gradually reduced from the upper end towards a lower end of the recessed channel.

10. The device according to claim 7 wherein the recessed channel extends helically downward at an inclination of less than 70 degrees from the longitudinal direction of the center tube.

11. The device according to claim 1 wherein the upper end of the inlet tube extends at an inclination of less than 45 degrees from the longitudinal direction of the center tube.

12. The device according to claim 1 in combination with an implement shank supporting a furrow opener which supports the material outlet thereon, the device being supported only by connection of the lower end of the center tube with the outlet member on the furrow opener and connection of the inlet tube to the distribution tube.

13. The device according to claim 1 wherein the center tube further comprises:
    an upper portion surrounded by an upper portion of the recessed channel having a closed inner side such that the upper portion of the center tube and the upper portion of the recessed channel do not directly communicate with one another; and
    a lower portion surrounded by a lower portion of the recessed channel having an open inner side such that the lower portion of the recessed channel is in open communication with the center tube.

* * * * *